US007353287B2

(12) United States Patent
Parent et al.

(10) Patent No.: US 7,353,287 B2
(45) Date of Patent: Apr. 1, 2008

(54) MARKED FOREIGN DATA BLOCKS

(75) Inventors: Sean R. Parent, Morgan Hill, CA (US); Glenn G. Gilley, Los Altos, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1013 days.

(21) Appl. No.: 09/965,117

(22) Filed: Sep. 26, 2001

(65) Prior Publication Data

US 2003/0097462 A1 May 22, 2003

(51) Int. Cl.
*G06F 15/16* (2006.01)
(52) U.S. Cl. ..................................................... 709/236
(58) Field of Classification Search ............. 715/500.1, 715/500, 513, 501.1, 514–517, 530, 539–540; 709/236, 246
See application file for complete search history.

(56) References Cited

U.S. PATENT DOCUMENTS

| | | | | | |
|---|---|---|---|---|---|
| 5,486,686 | A | * | 1/1996 | Zdybel et al. | 235/375 |
| 5,528,742 | A | * | 6/1996 | Moore et al. | 715/542 |
| 5,706,290 | A | * | 1/1998 | Shaw et al. | 370/465 |
| 5,778,359 | A | * | 7/1998 | Stent | 707/4 |
| 6,064,748 | A | * | 5/2000 | Hogan | 382/100 |
| 6,070,160 | A | * | 5/2000 | Geary | 707/4 |
| 6,418,448 | B1 | * | 7/2002 | Sarkar | 707/104.1 |
| 6,496,543 | B1 | * | 12/2002 | Zehavi | 375/295 |
| 6,810,429 | B1 | * | 10/2004 | Walsh et al. | 709/246 |
| 6,850,228 | B1 | * | 2/2005 | Parks et al. | 345/173 |
| 6,941,510 | B1 | * | 9/2005 | Ozzie et al. | 715/513 |
| 6,959,415 | B1 | * | 10/2005 | Soderberg et al. | 715/513 |
| 6,963,972 | B1 | * | 11/2005 | Chang et al. | 713/153 |
| 6,996,770 | B1 | * | 2/2006 | Deen et al. | 715/513 |
| 2001/0037415 | A1 | * | 11/2001 | Freishtat et al. | 709/328 |
| 2002/0069157 | A1 | * | 6/2002 | Jordan | 705/37 |
| 2004/0015832 | A1 | * | 1/2004 | Stapp et al. | 717/106 |
| 2004/0210535 | A1 | * | 10/2004 | Erickson | 705/54 |

OTHER PUBLICATIONS

Backlund, Bjorn; OOE: A Compound Document Framework; SIGCHI Bulletin; vol. 29 No. 1; Jan. 1997; http://www.acm.org/sigchi/bulletin/1997.1/backlund.html.*

Borenstein, et. al. "MIME (Multipurpose Internet Mail Extensions) Part One: Mechanisms for Specifying and Describing the Format of Internet Message Bodies", The Internet Engineering Task Force Network Working Group, Request for Comments: 1521 Sep., 1993, Downloaded from the Internet at http://tools.ietf.org/html/rfc1521, on Jul. 10, 2007, 81 pages.

(Continued)

*Primary Examiner*—Andrew Caldwell
*Assistant Examiner*—Michael D. Meucci
(74) *Attorney, Agent, or Firm*—Fish & Richardson P.C.

(57) ABSTRACT

Methods and apparatus, including computer programs, implementing a technique for creating and using marked foreign data blocks. In general, in one aspect, the technique includes receiving a host data file and a foreign data block. The host data file has a host data file format that is a native file format for a host application. The foreign data block is not native to the host data file format. The technique includes determining characteristics of the foreign data block and generating information describing the characteristics of the foreign data block, including information marking the beginning and end of the foreign data block and further including an identifier designed to be distinguishable from all other data in the host data file. The technique includes embedding the information and the foreign data block as a foreign data block packet in the host data file.

62 Claims, 4 Drawing Sheets

OTHER PUBLICATIONS

Freed, et al. "MIME Parameter Value and Encoded Word Extensions: Character Sets, Languages, and Continuations", The Internet Engineering Task Force Network Working Group, Request for Comments: 2331, Nov., 1997, Downloaded from the Internet at http://www.tools.ietf.org/html/rfc2231, on Jul. 10, 2007, 10 pages.

Freed, et al. "Multipurpose Internet Mail Extensions (MIME) Part One: Format of Internet Message Bodies", The Internet Engineering Task Force Network Working Group, Request for Comments: 2045, Nov., 1996, Downloaded from the Internet at http://www.tools.ietf.org/html/rfc2045, on Jul. 10, 2007, 31 pages.

Freed, et al. "Multipurpose Internet Mail Extensions (MIME) Part Five: Conformance Criteria and Examples", The Internet Engineering Task Force Network Working Group, Request for Comments: 2049, Nov., 1996, Downloaded from the Internet at http://www.tools.ietf.org/html/rfc2049, on Jul. 10, 2007, 24 pages.

Freed, et al. "Multipurpose Internet Mail Extensions (MIME) Part Two: Media Types", The Internet Engineering Task Force Network Working Group, Request for Comments: 2046, Nov., 1996, Downloaded from the Internet at http://www.tools.ietf.org/html/rfc2046, on Jul. 10, 2007, 44 pages.

Grand, "MIME Overview", Oct. 26, 1993, downloaded from the Internet at http://www.mgrand.home.mindspring.com/mime.html on Jul. 10, 2007, 13 pages.

Levinson, "The MIME Multipart/Related Content-Type", The Internet Engineering Task Force Network Working Group, Request for Comments: 2387, Aug., 1998, Downloaded from the Internet at http://www.tools.ietf.org/html/rfc2387, on Jul., 10, 2007, 10 pages.

Moore, "MIME (Multipurpose Internet Mail Extensions) Part Three: Message Header Extensions for Non ASCII Text", The Internet Engineering Task Force Network Working Group, Request for Comments: 2047, Nov., 1996, Downloaded from the Internet at http://www.tools.ietf.org/html/rfc2047, on Jul. 10, 2007, 15 pages.

Tichy, "RCS-A System for Version Control", Jan. 3, 1991, Ddownloaded from the Internet at http://www.cs.purdue.edu/homes/trinkle/RCS/rcs.ps on Jul. 10, 2007, 20 pages.

* cited by examiner

US 7,353,287 B2

MARKED FOREIGN DATA BLOCKS

BACKGROUND OF THE INVENTION

The present invention relates to embedding and extracting data blocks in a host data file or document.

Many data formats, such as Adobe Photoshop®, can contain different blocks of data. These data blocks represent contents, such as images or text, support information, such as pointers and tables, and metadata, such as image dimensions and captions. In order for applications other than the generator of the file to understand these data blocks, the format of the data file must be documented and published, and/or a toolkit or library must be provided. If the data format is complicated, the documentation or toolkit is correspondingly complicated, which can make it difficult for another application to read, understand, and write the data format. In many cases, a file format represents a container for other data. The intent of such a format is to allow other applications to store data blocks inside of this container. However, if the container format is complicated, use by other applications is inhibited.

SUMMARY OF THE INVENTION

The present invention provides methods and apparatus, including computer program products, for creating and using marked data blocks in a digital document or data file.

This specification will use the term "foreign data block" to refer to a data block that is or will be embedded in a host data file in a way that allows it to be found and possibly modified by a computer program that will be referred to as a foreign application. A foreign application is an application that is not programmed to understand the format of the host data file, which will be referred to as the host data file format. A host application, on the other hand, is a computer program that is programmed to understand the format of the host data file.

In general, in one aspect, the present invention provides a method for embedding a foreign data block in a host data file. A system performing the method receives a host data file and a foreign data block. The host data file has a host data file format that is a native file format for a host application. The foreign data block is not native to the host data file format. The system determines the characteristics of the foreign data block and generates information that describes these characteristics, including information marking the beginning and end of the foreign data block and further including an identifier designed to be distinguishable from all other data in the host data file. The system embeds the information and the foreign data block as a foreign data block packet in the host data file. The foreign data block is identifiable, extractable, and modifiable by computer programs not configured to recognize the host file data format.

In general, in another aspect, the present invention provides a computer program product, tangibly stored on a machine-readable medium. The computer program product includes instructions operable to cause a programmable processor to receive a host data file. The host data file has a host data file format that is not recognizable by the computer program product. The computer program product scans for a header that indicates the beginning of an embedded foreign data block packet that contains a foreign data block that is not native to the host data file format. The foreign data block has a format that is recognizable by the computer program product. The header includes an identifier designed to be distinguishable from all other data in the host data file. The header describes the characteristics of the foreign data block. The computer program product processes a header when the header is located.

In general, in another aspect, the present invention provides a method for embedding a foreign data block in a host data file. A system performing the method receives a host data file and a foreign data block to be embedded into the host data file. The host data file has a host data file format that is a native file format for a host application. The foreign data block is not native to the host data file format and is delimited by a header and a trailer. The header includes an identifier that is designed to be distinguishable from all other data in the host data file. The system embeds the header, data block, and trailer in the host data file so that the foreign data block is identifiable, extractable, and modifiable by computer programs not configured to recognize the host file data format.

In general, in another aspect, the present invention provides a computer program product, tangibly stored on a machine-readable medium, for embedding a foreign data block in a host data file. The computer program product includes instructions for causing a computer to receive a host data file and a foreign data block to be embedded into the host data file. The host data file has a host data format that is a native file format for the computer program. The foreign data block is not native to the host data file format and is delimited by a header and a trailer. The header includes an identifier that is designed to be distinguishable from all other data in the host data file. The computer program further includes instructions to cause the computer to embed the header, data block, and trailer in the host data file so that the foreign data block is identifiable, extractable, and modifiable by computer programs not configured to recognize the host file data format.

In general, in one aspect, the present invention provides a computer program product, tangibly stored on a machine-readable medium, for embedding a foreign data block in a host data file. The computer program product includes instructions operable to cause a programmable processor to receive a host data file and a foreign data block. The host data file has a host data file format that is a native file format for a host application. The foreign data block is not native to the host data file format. The computer program product determines the characteristics of the foreign data block and generates information that describes these characteristics, including information marking the beginning and end of the foreign data block and further including an identifier designed to be distinguishable from all other data in the host data file. The computer program product embeds the information and the foreign data block as a foreign data block packet in the host data file. The foreign data block is identifiable, extractable, and modifiable by computer programs not configured to recognize the host file data format.

In general, in one aspect, the present invention provides a computer program product, tangibly stored on a machine-readable medium, for embedding metadata in a host data file having a non-XML format. The computer program product comprises instructions operable to cause a programmable processor to receive a host data file and metadata. The host data file has a format that is not XML and that is a native file format for a host application. The metadata has a format that is not native to the host data file format. The computer program product determines the characteristics of the metadata and generates information that describes these characteristics, including information marking the beginning and end of the metadata and further including an identifier designed to be distinguishable from all other data in the host data file. The computer program product embeds the information and the metadata as a packet in the host data file. The metadata is identifiable, extractable, and modifiable by computer programs not configured to recognize the host file data format.

The invention can be implemented to realize one or more of the following advantages. A foreign application can locate embedded foreign data blocks in host data files even when the host data files have formats that the foreign application does not recognize. A single foreign application can be used to locate foreign data blocks in multiple host-data-file formats. Once an embedded foreign data block is located in a host data file, a user can make in-place edits of the foreign data block. The in-place edits can expand the foreign data block without invalidating the foreign data block or corrupting the host data file. A header and trailer of an embedded foreign data block, as well as the foreign data block itself, can have a binary or a text format. The text format can be Unicode 8, 16, and 32. The text format can be a double-byte format. A system in accordance with the invention can embed multiple foreign data blocks as well as multiple types of foreign data block into a single host data file. Such a system can embed foreign data blocks encoded in different formats. An embedded foreign data block can describe its host data file, thus allowing searches of multiple host data files without executing a host application and opening each hosts data file to be searched from within the host application.

The details of one or more implementations of the invention are set forth in the accompanying drawings and the description below. Other features and advantages of the invention will become apparent from the description, the drawings, and the claims.

BRIEF DESCRIPTION OF THE DRAWINGS

Like reference symbols in the various drawings indicate like elements.

DETAILED DESCRIPTION

Figure 1:
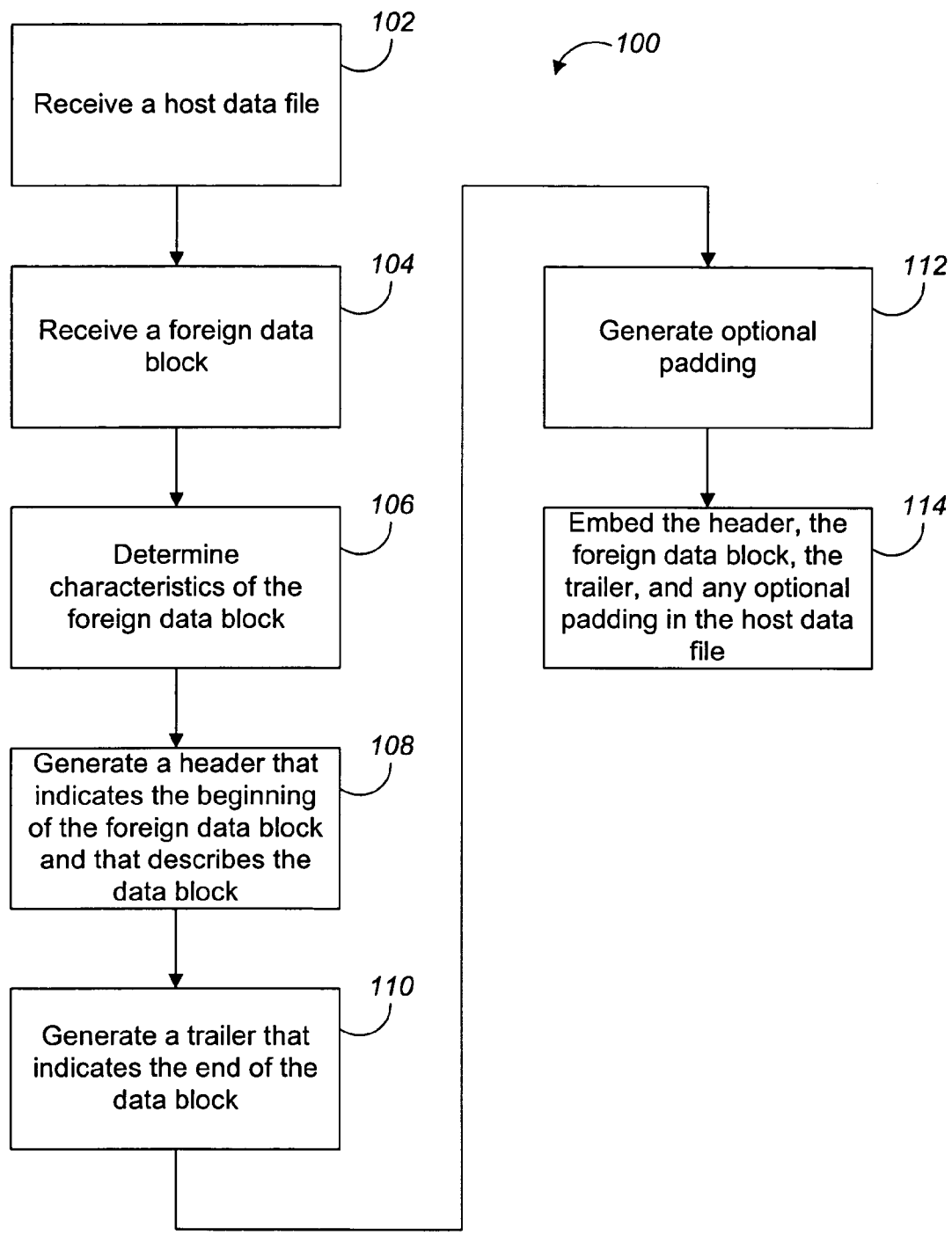
FIG. 1 shows a flow diagram of a method, in accordance with the invention, for embedding foreign data blocks.
Figure 2:
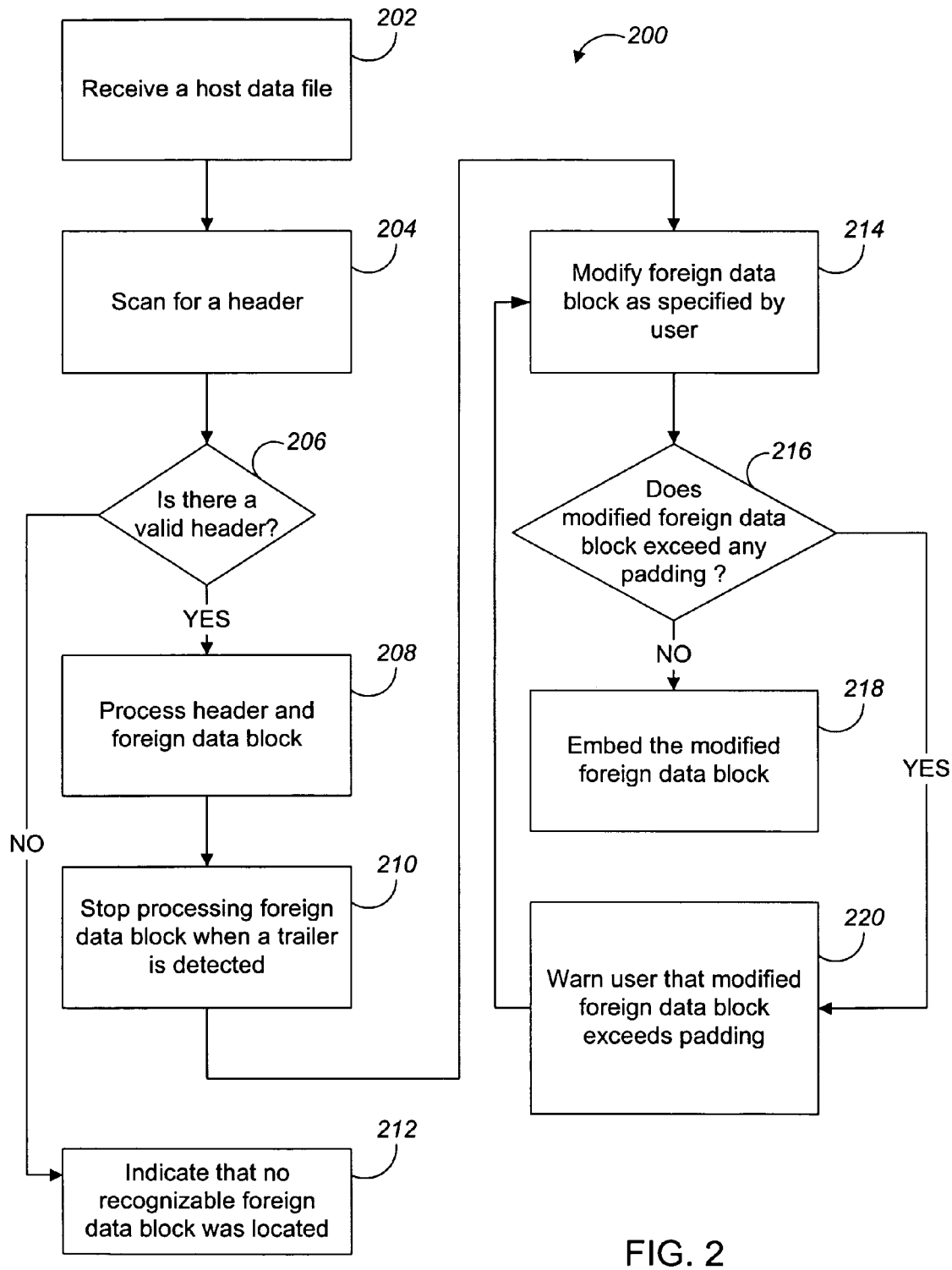
FIG. 2 shows a flow diagram of a method, in accordance with the invention, for locating and editing foreign data blocks.

As shown in FIG. 1, a system performing a method 100 for embedding a foreign data block receives a host data file (step 102). The system receives a foreign data block to be embedded into the host data file (step 104). The foreign data block can include information that describes the host data file, such as metadata indicating a version of the host data file or metadata describing an application from which the host data file was generated. The system determines the characteristics of the foreign data block (step 106). Determining characteristics includes computing the total length and determining the type of encoding of the data block. The system generates a header (step 108). The header includes information such as the characteristics of the foreign data block and a universal unique identifier ("UUID") that is designed to be distinguishable from all other data in the host data file. One function of the UUID is to enable a foreign application that does not recognize the format of the host data file to recognize a foreign data block among other data in the host data file. The system generates a trailer (step 110). Optionally, the system generates extra spacing so that the data block can be expanded (step 112). The header, foreign data block, trailer, and any optional padding will be referred to as a foreign data block packet. The extra spacing, referred to as padding, is inserted after the trailer. Alternatively, the padding can be elsewhere in the foreign data block packet. The system embeds the entire foreign data block packet into the host data file (step 114). The system knows the native data format of the host data file and, hence, is able to embed the packet in the host data file without corrupting the host data file. The header indicates the beginning and end of the foreign data block packet. The header also indicates the beginning of the foreign data block. The trailer indicates the end of the foreign data block. Alternatively, the header can also indicate the end of the foreign data block, in which case generating the trailer is not necessary. As shown in FIG. 2, another system performing a method 200 for locating and processing a foreign data block in a host data file receives a host data file (step 202). The system scans the host data file for a header that the system recognizes as indicating the beginning of a foreign data block packet that contains a foreign data block (step 204). If there are no recognizable headers (step 206), the system indicates that the host data file contains no recognizable foreign data block (step 212). If the system detects a recognizable header (step 206), the system processes the header and the corresponding foreign data block (step 208). The system continues processing until it detects a trailer that indicates the end of the foreign data block (step 210). Optionally, the system modifies the foreign data block in response to user input (step 214). If the modification does not cause the foreign data black to exceed any padding (step 216), then the system embeds the modified foreign data block into the host data file (step 218). Otherwise, the system indicates that the modified foreign data block exceeds the padding (step 220) and repeats steps 214 and 216 until the foreign data block does not exceed the padding. Specifically, the system further modifies the foreign data block in response to additional user input and checks if the current modification results in a current foreign data block that does not exceed the padding.

Figure 3:
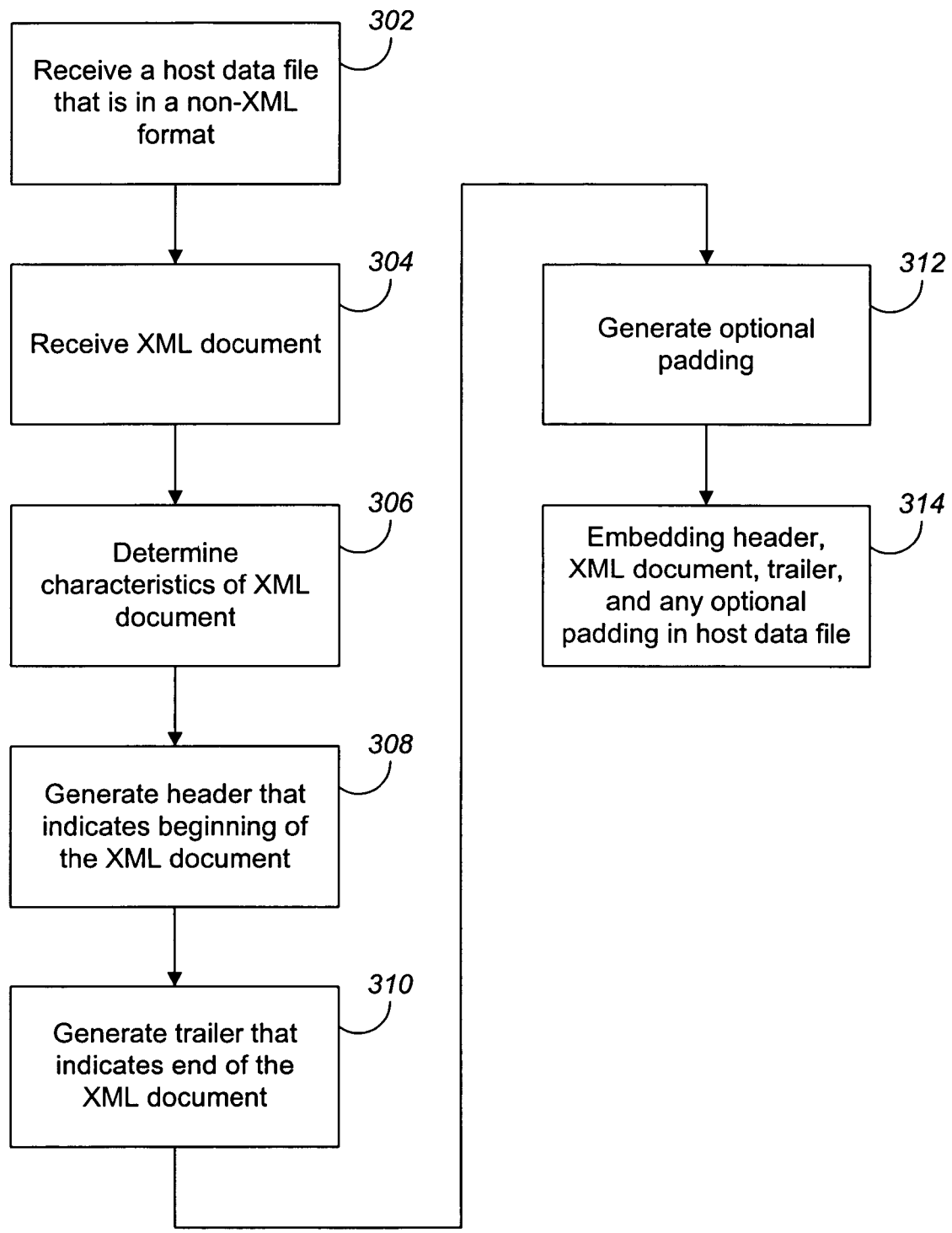
FIG. 3 shows a flow diagram of one implementation for imbedding a foreign data block in a host data file.

In one implementation, the foreign data block is an Extensible Markup Language ("XML") document and the host data file has a non-XML format. As shown in FIG. 3, a system of this implementation receives a host data file having a non-XML format (step 302). The system also receives an XML document to be embedded into the host data file (step 304). The system supports XML documents encoded in a binary or text format, which include UTF-8, 16, and 32.

The system determines characteristics of the XML document (step 306). The characteristics include encoding format, byte size, byte order, and whether the XML document complies with all XML well-formedness constraints. The well-formedness constraints are defined in section 1.2 of W3C, Extensible Markup Language (XML) 1.0 (Second Edition) (W3C Recommendation 6 Oct. 2000). If the XML document is not well formed, the system changes the document to comply with the XML well-formedness rules. For example, if the XML document has a byte-order mark ("BOM"), the system removes the BOM from the XML document. This removal is necessary because a well-formedness rule requires a BOM to be the first two bytes of a document entity, which in this case includes not only the XML document but also its associated header, trailer, and padding. Because the header precedes the XML document and is longer than two bytes, having any BOM in the XML document would violate this well-formedness rule.

The system generates a header (step 308). The header is an XML processing instruction such as the following one: <?xpacket . . . ?>. The header complies with the XML well-formedness rules. In generating the processing instruction, the system observes attribute syntax, such as attribute syntax (XML production 41). Table 1 provides an example of the attribute syntax.

TABLE 1

Attribute::=Name'='AttValue
AttValue::=‘"'([^<&"] | Reference)*'"'
| "'([^<&'] | Reference)*'"

The syntax accepts either matching single or double quotes. Having a syntax that allows the use of either matching single or double quotes prevents erroneous exclusions of attribute values when an XML packet has a wrong quote character, e.g., when the XML packet has single quotes when the system expects double quotes.

The processing instruction of the header includes multiple attributes, one of which is a mandatory attribute named "begin". The begin attribute indicates the beginning of an XML packet, which includes an XML document and its corresponding header, trailer, and any optional padding. The begin attribute also serves as a BOM for any 16 and 32 bit encoding. In this implementation, the value of the begin attribute is the Unicode BOM character U+FEFF. The system encodes this value in the same encoding format and byte order as those of the corresponding XML document.

The processing instruction further includes a mandatory attribute named "ID". For XML packets having the production 41 attribute syntax, the value of the ID is the following string of 7-bit ASCII characters: "W5M0MpCehiHzreSzNTczkc9d". This value is designed to be distinguishable from all other data in the host data file. The ID attribute value is encoded in the character encoding of the overall packet. For example, if the encoding of the overall packet is big-endian UTF-16, then the system converts the ID value from 7-bit ASCII to big-endian UTF-16. The system uses other ID values for XML packets having syntax that is not production 41 attribute syntax. Each ID value corresponds to one syntax.

The system generates the ID value by creating an 18-byte binary string. The string starts with the character '[', which is followed by a 128-bit binary UUID, which in turn is followed by the character ']'. In hex, the unencoded 128-bit UUID is: 933432909e8621f3ade4b335373391cf. The system then encodes the 18-byte binary string using base64 encoding. The square brackets are added to bring the byte count to a multiple of three without having to use the base64 padding characters.

Optionally, the processing instruction includes an attribute named "bytes". The value of this attribute is the byte count of the entire XML packet, including the header, trailer, and any padding. The system includes this attribute when the foreign data block is writable.

Optionally, the processing instruction includes an attribute named "encoding". This attribute specifies the character encoding of the entire XML packet and is identical to the encoding attribute in the XML declaration of the XML document. The system omits this attribute when the encoding of the XML packet is UTF-8.

The system generates a trailer (step 310). Similar to the header, the trailer is an XML processing instruction such as: <?xpacket . . . ?>. The trailer complies with the XML well-formedness constraints. This processing instruction indicates the end of the XML document and the beginning of any well-formed padding. The processing instruction of the trailer includes an XML attribute called "end". The value of this attribute if either "r" or "w". When the value is "r", the XML packet is a read-only packet and cannot be modified in place. When the value is "w", the XML packet may be modified in place if and only if there is sufficient padding. If a modification causes the XML document to exceed padding in the XML packet, the system prompts for further modification until the XML document no longer exceeds the padding. If a modification reduces the size of the XML document, the system grows the padding in the XML packet so that the overall size of the XML packet remains constant.

The system optionally generates padding (step 312). The padding complies with the XML well-formedness constraints. In this implementation, the padding is the blank character U+0020. Alternatively, the padding can be one or more of: XML compatible comments, processing instructions, or other white space. The system need not generate padding when the XML packet is a read-only packet.

The amount of padding can vary depending on the requirements and assets of the system. One factor that affects padding amount is the amount of storage space available to the system. Padding amount can grow as storage space increases. Another factor is the number of XML packets expected to be embedded in a host data file. Padding amount can grow as the number of expected XML packets decreases. Another factor that affects padding size is the potential growth of the XML packet. The system correlates potential growth of an XML packet with the expected number of edits of the XML document in the XML packet. If the XML packet is expected to be edited multiple times, then the system generates a large amount of padding to anticipate potential growth of the XML packet caused by such edits. An XML packet embedded in a source document is an example of a packet that is expected to be changed multiple times. On the other hand, if the document is not expected to be edited, the system generates little padding. An XML packet embedded in a final rendition of a document is an example of a packet that is not expected to be edited.

The amount of padding can be a function of the size of the XML document, such as twenty percentage of a typical packet or the actual packet, whichever is larger. The percentage can be selected to accommodate different types and uses of XML packets. Alternatively, the amount of padding can be fixed. The fixed amount can depend on factors, such as the number of expected edits of an XML document, discussed in the previous paragraph. For example, for a final form rendition, such as a JPEG document for the Web, the fixed padding amount can be 20 bytes. For a source document, the fixed padding amount can be 4K bytes. The padding features described are not restricted to XML documents but rather can apply to other types of foreign data blocks.

The system embeds the header, XML document, trailer, and any optional padding as an XML packet into the host data file (step 314). Table 2 shows an example of an XML packet having an XML document that uses UTF-16 encoding in big-endian order. As shown in Table 2, the XML packet includes a header and a trailer, both of which delimit the XML document. The XML packet also includes padding. The entire XML packet conforms to the XML well-formedness rules. For efficiency reasons, the system does not nest XML packets within each other.

TABLE 2

<? xpacket begin='' id='W5M0MpCehiHzreSzNTczkc9d'bytes='1496' encoding='UTF-16'?>
. . . 700 bytes of XML document text . . .
<? xpacket end='w'?>
. . . 500 bytes of padding . . .

After the system embeds the XML document into the host data file, a foreign application, such as a parsing or scanning application, can locate and process the XML packet.

Figure 4:
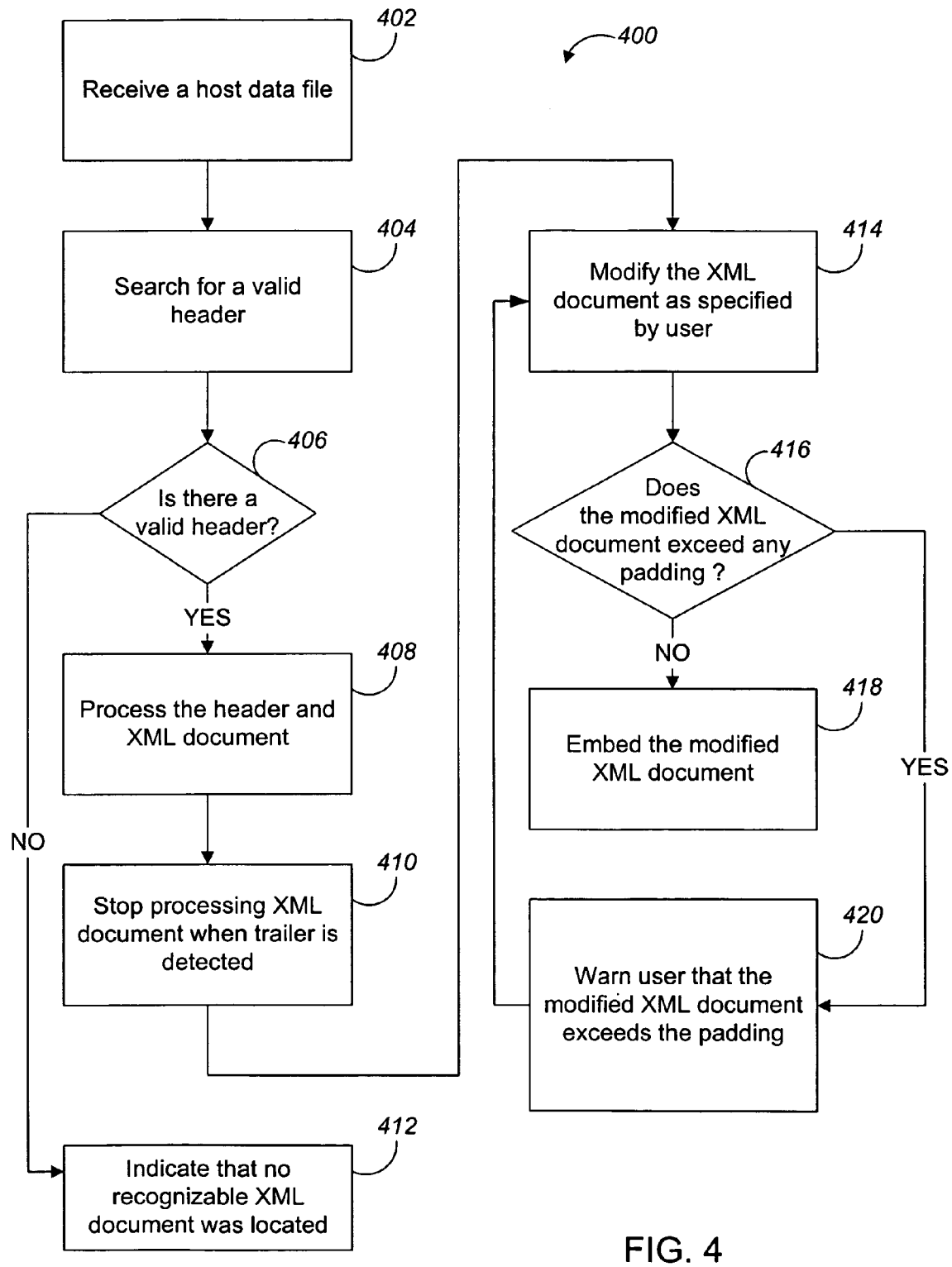
FIG. 4 shows a flow diagram of one implementation for locating and processing a foreign data block in a host data file.

As shown in FIG. 4, a foreign application performing method 400 receives a host data file that may or may not contain one or more recognizable XML packets (step 402). The foreign application searches for a valid header (step 404). A valid header is written in an XML syntax recognizable by the foreign application, e.g., the attribute syntax, and contains a UUID that the foreign application recognizes, such as the described UUID.

To locate a valid header, the foreign application need not be able to recognize the format of the host data file. The foreign application scans byte by byte for any of the byte patterns shown in Table 3. These byte pattern represents the characters inside the following quotation marks: "<?xpacket begin=".

TABLE 3

| Encoding | Byte Pattern |
| --- | --- |
| 16-bit | 0x3C 0x00 0x3F 0x00 0x78 0x00 0x70 0x00 0x61 0x00 0x63 0x00 0x6B 0x00 0x65 0x00 0x74 0x00 0x20 0x00 0x62 0x00 0x65 0x00 0x67 0x00 0x69 0x00 0x6E 0x00 0x3D (0x00) |
| 8-bit or multiple encoding | 0x3C 0x3F 0x78 0x70 0x61 0x63 0x6B 0x65 0x74 0x20 0x62 0x65 0x67 0x69 0x6E 0x3D |
| 32-bit | 0x3C 0x00 0x00 0x00 0x3F 0x00 0x00 0x00 0x78 0x00 0x00 0x00 0x70 0x00 0x00 0x00 0x61 0x00 0x00 0x00 0x63 0x00 0x00 0x00 0x6B 0x00 0x00 0x00 0x65 0x00 0x00 0x00 0x74 0x00 0x00 0x00 0x20 0x00 0x00 0x00 0x62 0x00 0x00 0x00 0x65 0x00 0x00 0x00 0x67 0x00 0x00 0x00 0x69 0x00 0x00 0x00 0x6E 0x00 0x00 0x00 0x3D |

16-bit encodings include UCS-2 and UTF-16. 8-bit encodings includes UTF-8, ASCII 7-bit, and ISOLatin-1. 32-bit encodings include UCS-4.

Note that with 16-bit encodings, the foreign application cannot determine the byte order from the above byte patterns because the pattern starts with the first non-zero value regardless of byte order. This means that there may not be a terminal 0x00 value.

When the foreign application locates one of the byte patterns, the foreign application searches for a quote or double quote character, which indicates the beginning of the begin attribute value. Once the foreign application detects the quote or double quote, the foreign application reads the value of the begin attribute. A begin attribute value of 0xFE 0xFF indicates that the encoding of the XML packet is big endian 16-bit encoding. A begin attribute value of 0xFF 0xFE indicates that the encoding of the XML packet is little endian 16-bit encoding. A begin attribute value of 0x00 0x00 0xFE 0xFF indicates that the encoding of the XML packet is big endian 32-bit encoding. A begin value of 0xFF 0xFE 0x00 0x00 indicates that the encoding of the XML packet is little endian 32-bit encoding. A begin attribute value of 0xEF 0xBB 0xBF indicates that the encoding of the XML packet is 8-bit encoding, such as UTF-8. When there is no begin attribute value, the encoding is 8-bit encoding and byte order is irrelevant. The foreign application stops reading the begin attribute value when it detects either another quote or double quote.

Once it reads the value of the begin attribute, the foreign application has sufficient data to process the remainder of the processing instruction of the header in the appropriate character encoding and, thus, switches to processing characters instead of bytes.

The foreign application reads the value of the ID attribute. If the UUID is not one that the foreign application recognizes, then the current XML packet is not one that the foreign application can process and the header is not valid; the foreign application switches back to the byte-by-byte search mode and searches the remainder of the host data file for one of the byte patterns shown in Table 3. If the foreign application does not detect a valid header, the foreign application indicates that it cannot find a recognizable XML packet in host data file (step 412).

If the UUID is one that the system recognizes, e.g., "W5M0MpCehiHzreSzNTczkc9d", then the header is valid and the XML packet is one that the foreign application can process. That is, the foreign application has found a valid header (step 406). The foreign application processes the remainder of the header, if there is any, and the XML document in the XML packet (step 408). The foreign application stops processing the XML document when it detects a trailer (step 410). The foreign application processes the trailer.

In response to user input, and only when the end attribute value in the trailer is "w", the foreign application modifies the XML document in accordance to the user input (step 414). The foreign application checks if the modification causes the XML document to exceed the padding in the XML packet (step 416). If it does not, the foreign application embeds the modified XML document into the space between the trailer and the header (step 418). When necessary, the foreign application grows the padding in the XML packet to keep the overall size of the XML packet constant. On the other hand, if the modification does cause the XML document to exceed the padding in the XML packet, the foreign application prompts the user for further modification and repeats steps 414 through 416 until the XML document no longer exceeds the padding (step 420).

Alternatively, instead of searching byte by byte for one of the patterns in Table 3, the foreign application skips the 0x00 values and searches only for the 8-bit pattern shown in Table 3. Once the system determines the byte order from processing the BOM of the ID attribute, the foreign application switches to processing characters instead of bytes.

As mentioned, the system does not allow nesting of foreign data block packets, such as XML packets, for efficiency reasons. An alternative implementation does support nesting of foreign data block packets with foreign data block packets. Nested foreign data block packets have the same encoding as the foreign data block packet in which they are nested. When a foreign application detects a nested header, i.e., one encountered after a previous header has been encountered but before a trailer is encountered, the foreign application performs a recursion to process the nested header and corresponding nested foreign data block packet. Foreign data block packets having multiple nested foreign data block packets may require multiple recursions. To support these types of foreign data block packets, the foreign application maintains a stack for tracking multiple recursions.

When a foreign application modifies a foreign data block, the foreign application alternatively can rewrite the entire corresponding foreign data block packet and then reinsert the rewritten foreign data block packet in place, i.e., at the same location in the host data file, of the original foreign data block packet. Rewriting includes attaching a header and trailer and modifying any padding so that the rewritten packet is the same size as the original packet.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. The essential elements of a computer are a processor for executing instructions and a memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular embodiments. Other embodiments are within the scope of the following claims. For example, steps of the invention can be performed in a different order and still achieve desirable results. A foreign data block can be any type of data and need not be an XML document. A host data file can be any electronic document in which foreign data blocks can be embedded, such as a Joint Photographic Experts Group ("JPEG") file or a Portable Document Format ("PDF") file created by the Acrobat® program, available from Adobe® Systems Incorporated of San Jose, Calif. PDF files are further described in the Portable Document Format Reference Manual version 1.3 (Feb. 19, 1998), also available from Adobe Systems Incorporated. The amount of padding does not need to vary and can be a fixed amount. In generating headers and trailers for XML documents, a system need not use the production 41 attribute syntax but, rather, can use any XML syntax. A foreign application searching for any of the byte patterns shown in Table 3 can skip the 0x00 values and search only for the 8-bit pattern shown in Table 3. Alternatively, the foreign application can use any other byte pattern that indicates the beginning of a valid foreign data block packet. A system for embedding foreign data blocks can receive a packet that already includes a header and trailer. The system does not generate a header and trailer for these types of packets.

What is claimed is:

1. A method for embedding a foreign data block in a host data file, comprising:
    receiving a host data file, the host data file having a host data file format;
    receiving a foreign data block;
    determining characteristics of the foreign data block, including a character encoding format of the foreign data block;
    generating packing data that describes the characteristics of the foreign data block, including data identifying the beginning and end of the foreign data block and further including an identifier designed to be distinguishable from all other data in the host data file, wherein generating packing data includes selecting, based on the character encoding format of the foreign data block, a byte pattern that indicates a presence of a header, and including the byte pattern in the packing data; and
    embedding the packing data and the foreign data block as a foreign data block packet in the host data file.

2. The method of claim 1, wherein:
    generating packing data includes generating the header for the foreign data block, the header including the byte pattern and the identifier and indicating the beginning of the foreign data block packet and the beginning of the foreign data block.

3. The method of claim 2, wherein:
    generating a header includes generating a header that indicates the end of the foreign data block packet.

4. The method of claim 2, wherein:
    generating packing data includes generating a trailer for the foreign data block, the trailer indicating the end of the foreign data block.

5. The method of claim 4, wherein the trailer further indicates whether the foreign data block packet is a read only packet.

6. The method of claim 2, wherein:
generating a header includes generating a header that indicates the end of the foreign data block.

7. The method of claim 1, further comprising:
including padding in the foreign data block packet to allow in place modifications of the foreign data block that cause the foreign data block to expand.

8. The method of claim 6, wherein:
determining characteristics of the foreign data block includes determining a size of the foreign data block; and
the amount of padding is a function of the size of the foreign data block.

9. The method of claim 7, wherein the amount of padding is a function of an expected number of in place modifications of the foreign data block in the foreign data block packet or an expected number of foreign data block packets to be embedded in the host data file.

10. The method of claim 1, wherein:
the foreign data block is a data block not native to the host file format.

11. The method of claim 1, wherein the foreign data block is an Extensible Markup Language (XML) document and the host file is in a non-XML format.

12. The method of claim 9, wherein:
determining characteristics of the foreign data block includes determining a byte order of the foreign data block; and
generating packing data includes generating information for specifying the byte order and character encoding format of the foreign data block, the character encoding format being one of an 8, 16, or 32 bit Unicode format.

13. The method of claim 1, wherein generating an identifier includes generating a different identifier for each different type of foreign data block when there are multiple types of foreign data blocks in the host data file.

14. The method of claim 1, wherein the foreign data block includes metadata information that describes the host data file.

15. The method of claim 12, wherein:
receiving a host data file includes receiving a host data file having a non XML format.

16. A computer program product, tangibly stored on a machine readable medium, comprising instructions operable to cause a programmable processor to:
receive a host data file; and
search for a header that indicates the beginning of an embedded foreign data block packet that contains a foreign data block, the foreign data block having a format that is recognizable by the computer program, the header including an identifier designed to be distinguishable from all other data in the host data file, the header further describing the characteristics of the foreign data block, wherein searching for the header comprises:
scanning byte by byte for a byte pattern that indicates a presence of a header; and
when the byte pattern is found, determining a character encoding format of the header and scanning character by character using the character encoding format to search for the identifier, and, if the identifier is found, processing the header or, if an identifier is not found, scanning a remaining portion of the host data file byte by byte for the byte pattern.

17. The computer program product of claim 14, further comprising instructions to:
process the foreign data block.

18. The computer program product of claim 15, further comprising instructions to:
stop processing the foreign data block when a trailer is detected, wherein the trailer indicates the end of the foreign data block.

19. The computer program product of claim 16, further comprising instructions to:
modify the foreign data block as specified by a user;
ensure that the modified foreign data block fits in the foreign data block packet; and
re embed the modified foreign data block in place of the original foreign data block.

20. The computer program product of claim 16, further comprising instructions to:
modify the foreign data block as specified by a user;
rewrite the foreign data block packet;
ensure that the re written foreign data block packet is the same size as the original foreign data block packet; and
re embed the re written foreign data block packet in place of the original foreign data block packet.

21. A computer program product, tangibly stored on a machine readable medium, for embedding a foreign data block in a host data file, comprising instructions operable to cause a programmable processor to:
receive a host data file, the host data file having a host data file format that is a native file format for a host application;
receive a foreign data block, the foreign data block being a data block that is not native to the host data file format;
determine characteristics of the foreign data block, including a character encoding format of the foreign data block;
generate information that describes the characteristics of the foreign data block, including information identifying the beginning and end of the foreign data block and further including an identifier designed to be distinguishable from all other data in the host data file, wherein generating information identifying the beginning of the foreign data block includes selecting, based on the character encoding format, a byte pattern that indicates a presence of the information marking the beginning of the foreign data block; and
embed the information and the foreign data block as a foreign data block packet in the host data file.

22. The product of claim 19, further comprising instructions to:
generate a header for the foreign data block, the header including the identifier and indicating the beginning of the foreign data block packet and the beginning of the foreign data block.

23. The product of claim 22, further comprising instructions to:
generate a header that indicates the end of the foreign data block packet.

24. The product of claim 22, further comprising instructions to:
generate a header that indicates the end of the foreign data block.

25. The product of claim 19, further comprising instructions to:
generate a trailer for the foreign data block, the trailer indicating the end of the foreign data block.

26. The product of claim 25, wherein the trailer further indicates whether the foreign data block packet is a read only packet.

27. The product of claim 19, further comprising instructions to:
include padding in the foreign data block packet to allow in place modifications of the foreign data block that cause the foreign data block to expand.

28. The product of claim 27, wherein
determining characteristics of the foreign data block includes determining a size of the foreign data block; and
the amount of padding is a function of the size of the foreign data block.

29. The product of claim 27, wherein the amount of padding is a function of an expected number of in place modifications of the foreign data block in the foreign data block packet or an expected number of foreign data block packets to be embedded in the host data file.

30. The product of claim 19, wherein the foreign data block is an Extensible Markup Language (XML) document and the host file is in a non-XML format.

31. The product of claim 23, further comprising instructions to:
determine a byte order of the foreign data block; and
generate a header that includes information for specifying the byte order and encoding format of the foreign data block, the encoding format being one of an 8, 16, or 32 bit Unicode format.

32. The product of claim 19, further comprising instructions to:
generate a different identifier for each different type of foreign data block when there are multiple types of foreign data blocks in the host data file.

33. The product of claim 21, wherein the foreign data block includes metadata information that describes the host data file.

34. The product of claim 33, further comprising instructions to:
receive a host data file having a non XML format.

35. A computer program product, tangibly stored on a machine readable medium, for embedding metadata in a host data file having a non XML format, comprising instructions operable to cause a programmable processor to:
receive a host data file having a format that is not XML and that is a native file format for a host application;
receive metadata having a format that is not native to the host data file format;
determine characteristics of the metadata, including a character encoding format of the metadata;
generate information that describes the characteristics of the metadata, including information identifying the beginning and end of the metadata and further including an identifier designed to be distinguishable from all other data in the host data file, wherein generating information identifying the beginning of the metadata includes selecting, based on the character encoding format, a byte pattern that indicates a presence of the information marking the beginning of the metadata; and
embed the information and the metadata as a packet in the host data file.

36. A method comprising:
receiving a host data file; and
searching for a header that indicates the beginning of an embedded foreign data block packet that contains a foreign data block, the foreign data block having a format that is recognizable by the computer program, the header including an identifier designed to be distinguishable from all other data in the host data file, the header further describing the characteristics of the foreign data block, wherein searching for the header comprises:
scanning byte by byte for a byte pattern that indicates a presence of a header; and
when the byte pattern is found, determining a character encoding format of the header and scanning character by character using the character encoding format to search for the identifier, and, if the identifier is found, processing the header or, if an identifier is not found, scanning a remaining portion of the host data file byte by byte for the byte pattern.

37. The method of claim 36, further comprising:
processing the foreign data block.

38. The method of claim 37, further comprising:
stop processing the foreign data block when a trailer is detected, wherein the trailer indicates the end of the foreign data block.

39. The method of claim 38, further comprising:
modifying the foreign data block as specified by a user;
ensuring that the modified foreign data block fits in the foreign data block packet; and
re embedding the modified foreign data block in place of the original foreign data block.

40. The method of claim 38, further comprising:
modifying the foreign data block as specified by a user;
rewriting the foreign data block packet;
ensuring that the re written foreign data block packet is the same size as the original foreign data block packet; and
re embedding the re written foreign data block packet in place of the original foreign data block packet.

41. A method for embedding metadata in a host data file having a non XML format, comprising:
receiving a host data file having a format that is not XML and that is a native file format for a host application;
receiving metadata having a format that is not native to the host data file format;
determining characteristics of the metadata, including a character encoding format of the metadata;
generating information that describes the characteristics of the metadata, including information identifying the beginning and end of the metadata and further including an identifier designed to be distinguishable from all other data in the host data file, wherein generating information identifying the beginning of the metadata includes selecting, based on the character encoding format, a byte pattern that indicates a presence of the information marking the beginning of the metadata; and
embedding the information and the metadata as a packet in the host data file.

42. A system for embedding a foreign data block in a host data file, comprising:
one or more computers operable to perform instructions to:
receive a host data file, the host data file having a host data file format;
receive a foreign data block;
determine characteristics of the foreign data block, including a character encoding format of the foreign data block;
generate packing data that describes the characteristics of the foreign data block, including data identifying the beginning and end of the foreign data block and further including an identifier designed to be distinguishable from all other data in the host data file, wherein generating packing data includes selecting, based on the character encoding format of the foreign data block, a byte pattern that indicates a presence of a header, and including the byte pattern in the packing data; and
embed the packing data and the foreign data block as a foreign data block packet in the host data file.

43. The system of claim 42, wherein:
generating packing data includes generating the header for the foreign data block, the header including the byte pattern and the identifier and indicating the beginning of the foreign data block packet and the beginning of the foreign data block.

44. The system of claim 43, wherein:
generating a header includes generating a header that indicates the end of the foreign data block packet.

45. The system of claim 43, wherein:
generating packing data includes generating a trailer for the foreign data block, the trailer indicating the end of the foreign data block.

46. The system of claim 45, wherein the trailer further indicates whether the foreign data block packet is a read only packet.

47. The system of claim 43, wherein:
generating a header includes generating a header that indicates the end of the foreign data block.

48. The system of claim 33, wherein the one or more computers are further operable to perform instructions to:
include padding in the foreign data block packet to allow in place modifications of the foreign data block that cause the foreign data block to expand.

49. The system of claim 48, wherein:
determining characteristics of the foreign data block includes determining a size of the foreign data block; and
the amount of padding is a function of the size of the foreign data block.

50. The system of claim 48, wherein the amount of padding is a function of an expected number of in place modifications of the foreign data block in the foreign data block packet or an expected number of foreign data block packets to be embedded in the host data file.

51. The system of claim 33, wherein:
the foreign data block is a data block not native to the host file format.

52. The system of claim 33, wherein the foreign data block is an Extensible Markup Language (XML) document and the host file is in a non-XML format.

53. The system of claim 52, wherein:
determining characteristics of the foreign data block includes determining a byte order of the foreign data block; and
generating packing data includes generating information for specifying the byte order and character encoding format of the foreign data block, the character encoding format being one of an 8, 16, or 32 bit Unicode format.

54. The system of claim 42, wherein generating an identifier includes generating a different identifier for each different type of foreign data block when there are multiple types of foreign data blocks in the host data file.

55. The system of claim 42, wherein the foreign data block includes metadata information that describes the host data file.

56. The system of claim 55, wherein:
receiving a host data file includes receiving a host data file having a non XML format.

57. A system comprising:
one or more computers operable to perform instructions to:
receive a host data file; and
search for a header that indicates the beginning of an embedded foreign data block packet that contains a foreign data block, the foreign data block having a format that is recognizable by the computer program, the header including an identifier designed to be distinguishable from all other data in the host data file, the header further describing the characteristics of the foreign data block, wherein searching for the header comprises:
scanning byte by byte for a byte pattern that indicates a presence of a header; and
when the byte pattern is found, determining a character encoding format of the header and scanning character by character using the character encoding format to search for the identifier, and, if the identifier is found, processing the header or, if an identifier is not found, scanning a remaining portion of the host data file byte by byte for the byte pattern.

58. The system of claim 57, wherein the one or more computers are further operable to perform instructions to:
process the foreign data block.

59. The system of claim 58, wherein the one or more computers are further operable to perform instructions to:
stop processing the foreign data block when a trailer is detected, wherein the trailer indicates the end of the foreign data block.

60. The system of claim 59, wherein the one or more computers are further operable to perform instructions to:
modify the foreign data block as specified by a user;
ensure that the modified foreign data block fits in the foreign data block packet; and
re embed the modified foreign data block in place of the original foreign data block.

61. The system of claim 59, wherein the one or more computers are further operable to perform instructions to:
modify the foreign data block as specified by a user;
rewrite the foreign data block packet;
ensure that the re written foreign data block packet is the same size as the original foreign data block packet; and
re embed the re written foreign data block packet in place of the original foreign data block packet.

62. A system for embedding metadata in a host data file having a non XML format, comprising:
one or more computers operable to perform instructions to:
receive a host data file having a format that is not XML and that is a native file format for a host application;
receive metadata having a format that is not native to the host data file format;
determine characteristics of the metadata, including a character encoding format of the metadata;
generate information that describes the characteristics of the metadata, including information identifying the beginning and end of the metadata and further including an identifier designed to be distinguishable from all other data in the host data file, wherein generating information identifying the beginning of the metadata includes selecting, based on the character encoding format, a byte pattern that indicates a presence of the information marking the beginning of the metadata; and
embed the information and the metadata as a packet in the host data file.

* * * * *

UNITED STATES PATENT AND TRADEMARK OFFICE
CERTIFICATE OF CORRECTION

| | | |
|---|---|---|
| PATENT NO. | : 7,353,287 B2 | |
| APPLICATION NO. | : 09/965117 | |
| DATED | : April 1, 2008 | |
| INVENTOR(S) | : Sean R. Parent and Glenn G. Gilley | |

It is certified that error appears in the above-identified patent and that said Letters Patent is hereby corrected as shown below:

Claim 5:
    column 10, line 65:
        delete "read only", and replace with --read-only--

Claim 7:
    column 11, line 6:
        delete "in place", and replace with --in-place--

Claim 8:
    column 11, line 8:
        delete "claim 6", and replace with --claim 7--

Claim 9:
    column 11, line 15:
        delete "in place", and replace with --in-place--

Claim 12:
    column 11, line 25:
        delete "claim 9", and replace with --claim 11--

Claim 15:
    column 11, line 40:
        delete "claim 12", and replace with --claim 14-- column 11, line 42:
        delete "non XML", and replace with --non-XML--

Claim 17:
    column 11, line 65:
        delete "claim 14", and replace with --claim 16--

UNITED STATES PATENT AND TRADEMARK OFFICE
CERTIFICATE OF CORRECTION

| | |
|---|---|
| PATENT NO. | : 7,353,287 B2 |
| APPLICATION NO. | : 09/965117 |
| DATED | : April 1, 2008 |
| INVENTOR(S) | : Sean R. Parent and Glenn G. Gilley |

It is certified that error appears in the above-identified patent and that said Letters Patent is hereby corrected as shown below:

Claim 18:
    column 12, line 1:
        delete "claim 15", and replace with --claim 17--

Claim 19:
    column 12, line 6:
        delete "claim 16", and replace with --claim 18-- column 12, line 11:
        delete "re embed", and replace with --re-embed--

Claim 20:
    column 12, line 13:
        delete "claim 16", and replace with --claim 18-- column 12, line 17:
        delete "re written", and replace with --re-written-- column 12, line 19:
        delete "re embed", and replace with --re-embed-- column 12, line 19:
        delete "re written", and replace with --re-written--

Claim 22:
    column 12, line 46:
        delete "claim 19", and replace with --claim 21--

Claim 25:
    column 12, line 60:
        delete "claim 19", and replace with --claim 21--

UNITED STATES PATENT AND TRADEMARK OFFICE
CERTIFICATE OF CORRECTION

PATENT NO. : 7,353,287 B2
APPLICATION NO. : 09/965117
DATED : April 1, 2008
INVENTOR(S) : Sean R. Parent and Glenn G. Gilley It is certified that error appears in the above-identified patent and that said Letters Patent is hereby corrected as shown below:

Claim 26:
    column 12, line 65:
        delete "read only", and replace with --read-only--

Claim 27:
    column 13, line 1:
        delete "claim 19", and replace with --claim 21-- column 13, line 4:
        delete "in place", and replace with --in-place--

Claim 28:
    column 13, line 6:
        delete "wherein", and replace with --wherein:--

Claim 29:
    column 13, line 13:
        delete "in place", and replace with --in-place--

Claim 30:
    column 13, line 17:
        delete "claim 19", and replace with --claim 21--

Claim 31:
    column 13, line 20:
        delete "claim 23", and replace with --claim 30--

Claim 32:
    column 13, line 27:
        delete "claim 19", and replace with --claim 21--

UNITED STATES PATENT AND TRADEMARK OFFICE
CERTIFICATE OF CORRECTION

| | | |
|---|---|---|
| PATENT NO. | : 7,353,287 B2 | |
| APPLICATION NO. | : 09/965117 | |
| DATED | : April 1, 2008 | |
| INVENTOR(S) | : Sean R. Parent and Glenn G. Gilley | |

It is certified that error appears in the above-identified patent and that said Letters Patent is hereby corrected as shown below:

Claim 34:
    column 13, line 17:
        delete "non XML", and replace with --non-XML--

Claim 35:
    column 13, line 40:
        delete "non XML", and replace with --non-XML--

Claim 39:
    column 14, line 23:
        delete "re embedding", and replace with --re-embedding--

Claim 40:
    column 14, line 28:
        delete "re written", and replace with --re-written-- column 14, line 31:
        delete "re embedding", and replace with --re-embedding-- column 14, line 31:
        delete "re written", and replace with --re-written--

Claim 41:
    column 14, line 34:
        delete "non XML", and replace with --non-XML--

Claim 46:
    column 15, line 21:
        delete "read only", and replace with --read-only--

UNITED STATES PATENT AND TRADEMARK OFFICE
CERTIFICATE OF CORRECTION

| | |
|---|---|
| PATENT NO. | : 7,353,287 B2 |
| APPLICATION NO. | : 09/965117 |
| DATED | : April 1, 2008 |
| INVENTOR(S) | : Sean R. Parent and Glenn G. Gilley |

It is certified that error appears in the above-identified patent and that said Letters Patent is hereby corrected as shown below:

Claim 48:
    column 15, line 26:
        delete "claim 33", and replace with --claim 42-- column 15, line 29:
        delete "in place", and replace with --in-place--

Claim 50:
    column 15, line 38:
        delete "in place", and replace with --in-place--

Claim 51:
    column 15, line 42:
        delete "claim 33", and replace with --claim 42--

Claim 52:
    column 15, line 45:
        delete "claim 33", and replace with --claim 42--

Claim 53:
    column 15, line 52:
        delete "infonnation", and replace with --information--

Claim 56:
    column 15, line 65:
        delete "non XML", and replace with --non-XML--

Claim 60:
    column 16, line 34:
        delete "re embed", and replace with --re-embed--

UNITED STATES PATENT AND TRADEMARK OFFICE
CERTIFICATE OF CORRECTION

PATENT NO. : 7,353,287 B2
APPLICATION NO. : 09/965117
DATED : April 1, 2008
INVENTOR(S) : Sean R. Parent and Glenn G. Gilley It is certified that error appears in the above-identified patent and that said Letters Patent is hereby corrected as shown below:

Claim 61:
    column 16, line 40:
        delete "re written", and replace with --re-written-- column 16, line 42:
        delete "re embed", and replace with --re-embed-- column 16, line 42:
        delete "re written", and replace with --re-written--

Claim 62:
    column 16, line 45:
        delete "non XML", and replace with --non-XML--

Signed and Sealed this

Third Day of February, 2009

JOHN DOLL
*Acting Director of the United States Patent and Trademark Office*